Feb. 20, 1962  A. G. LAUCK  3,021,644
GLASS MOLD CARRIER ASSEMBLY
Filed March 24, 1958  3 Sheets-Sheet 3
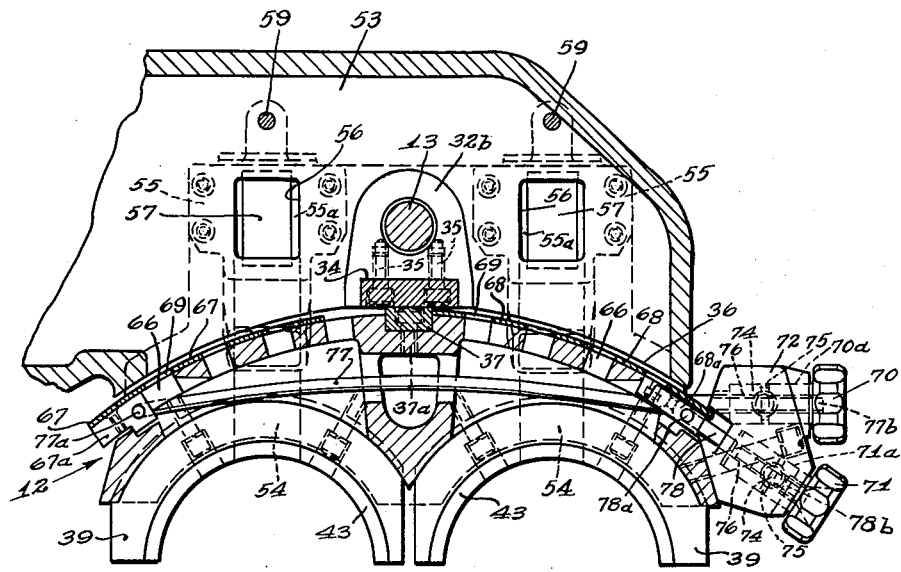
Fig. 3
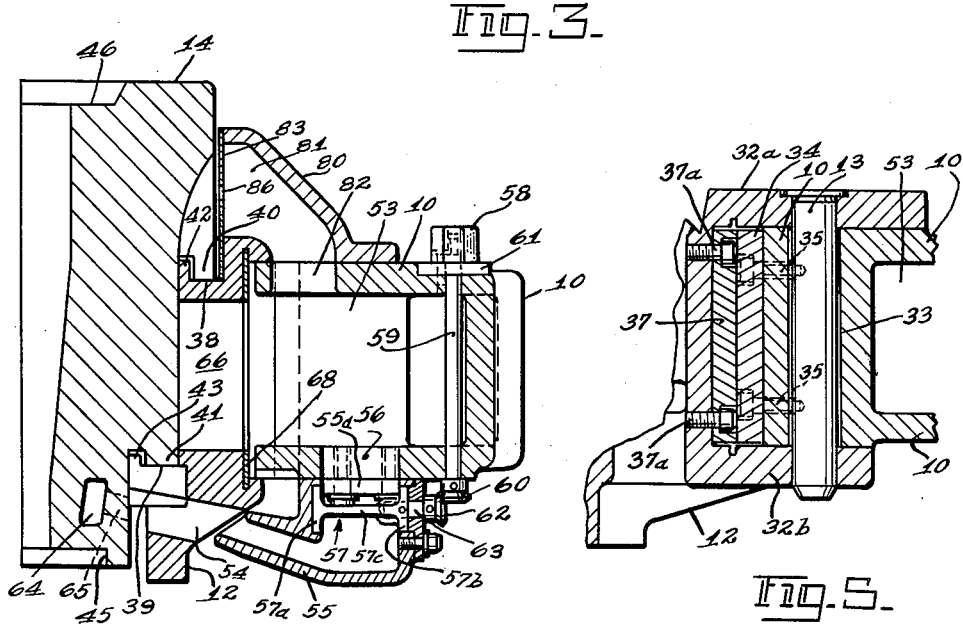
Fig. 4
Fig. 5
INVENTOR.
ALBERT G. LAUCK
BY
J. R. Nelson
and
W. A. Schaich
ATTORNEYS United States Patent Office 3,021,644
Patented Feb. 20, 1962

3,021,644
GLASS MOLD CARRIER ASSEMBLY
Albert G. Lauck, Toledo, Ohio, assignor to Owens-Illinois Glass Company, a corporation of Ohio
Filed Mar. 24, 1958, Ser. No. 723,224
2 Claims. (Cl. 49—41)

The present invention relates to a glass mold assembly useable on a glass article forming machine, and more particularly to such a mold assembly utilizing an improved mounting for aligning and equalizing split molds on closing and including in such mounting improved means for application of controlled cooling of the mold.

Split glass molds are extensively used on glass forming machines and are mounted on mechanism which swing the mold halves to and from a mold closed position. In this type mold, the mold halves, when in closed position, define a cavity therebetween that is open at both ends and capable of forming the major longitudinal wall portion of a glass article, such as a bottle, jar, or the like. These molds are operated in conjunction with a neck mold having a cavity for forming the neck finish of the glass article integral with the article's longitudinal wall portion and a bottom plate or baffle operable to close the open end portion of the mold cavity opposite the neck finish for forming an integral bottom wall of the article. In closing the mold halves, they are made to register with the neck molds by closing around a portion of the latter. The bottom plate or baffle is made to close the mold cavity by seating it on the bottom end of the mold. Also, where double cavity molds or a plurality of molds are carried on the same opening and closing mechanism, the mechanism must be adjusted to operate accurately so that the molds will be closed uniformly and equally. Otherwise, the wall of the formed article will be produced with opposed fins or ridges at the parting line or seam of the mold sections.

Due to high speed operation in working molten glass, the modern glass forming machine requires that the temperature of its molds be closely controlled at their glass contacting surfaces. This is generally accomplished by applying a coolant to the exterior surface of the mold body. To obtain the desirable accuracy and flexibility of control, this invention contemplates, as one of its important objects, controlling the cooling rate individually of each mold between a plurality of longitudinal zones about the peripheral area of the mold, and by so doing the ultimate distribution of the glass throughout the longitudinal walls of the article to be formed may be controlled.

It is also one of the objects of the present invention to provide a mold assembly including a novel adapter for mounting molds so that they are self-aligning and self-equalizing on closing.

Another object of the present invention is to provide such a mold assembly, including such an adapter, for mounting double cavity molds so that they are self-aligning and self-equalizing on closing.

A further object of the invention is the provision of such a mold mounting permitting readily detaching any of the molds on the machine while the machine is operating for replacing worn or defective molds without interrupting other molds of the machine.

A still further object of the invention is to provide a mold assembly providing three zones of controlled cooling applied through a mounting adapter and individual to each such zone about a longitudinally disposed peripheral area of each mold.

A further object of the invention is to provide a mold assembly having such individually controlled three-zone cooling for the mold wherein application of the coolant to each of said zones is readily regulable without interrupting the operation of the forming machine.

Another object of the present invention is a mold assembly providing, through an adapter mounted on the mold opening and closing mechanism, a mold mounting that permits limited lateral floating movement for equalizing mold closing.

Another object of the invention is to provide a mold assembly, including an adapter, for mounting split molds individually thereon so that they are each permitted limited lateral and longitudinal float for self-aligning the cavity of the mold with a neck mold when the former is closed on the latter.

The specific nature of this invention, as well as other objects and advantages thereof, will become apparent to those skilled in the art from the following detailed description, taken in conjunction with the annexed sheets of drawings, on which, by way of preferred example only, is illustrated a practical embodiment of this invention.

On the drawings:

FIG. 3 is a sectional plan view taken along line 3—3 of FIG. 2.

FIG. 4 is a sectional elevational view taken along line 4—4 of FIG. 1.

FIG. 5 is a sectional elevational view taken along line 5—5 of FIG. 1.

The invention as herein illustrated is used with a glass blowing machine of the type disclosed in U.S. Patent No. 2,748,536, issued June 5, 1956 to R. G. Allen, which patent illustrates a blank mold closing mechanism for a partible blank mold.

Figure 1:
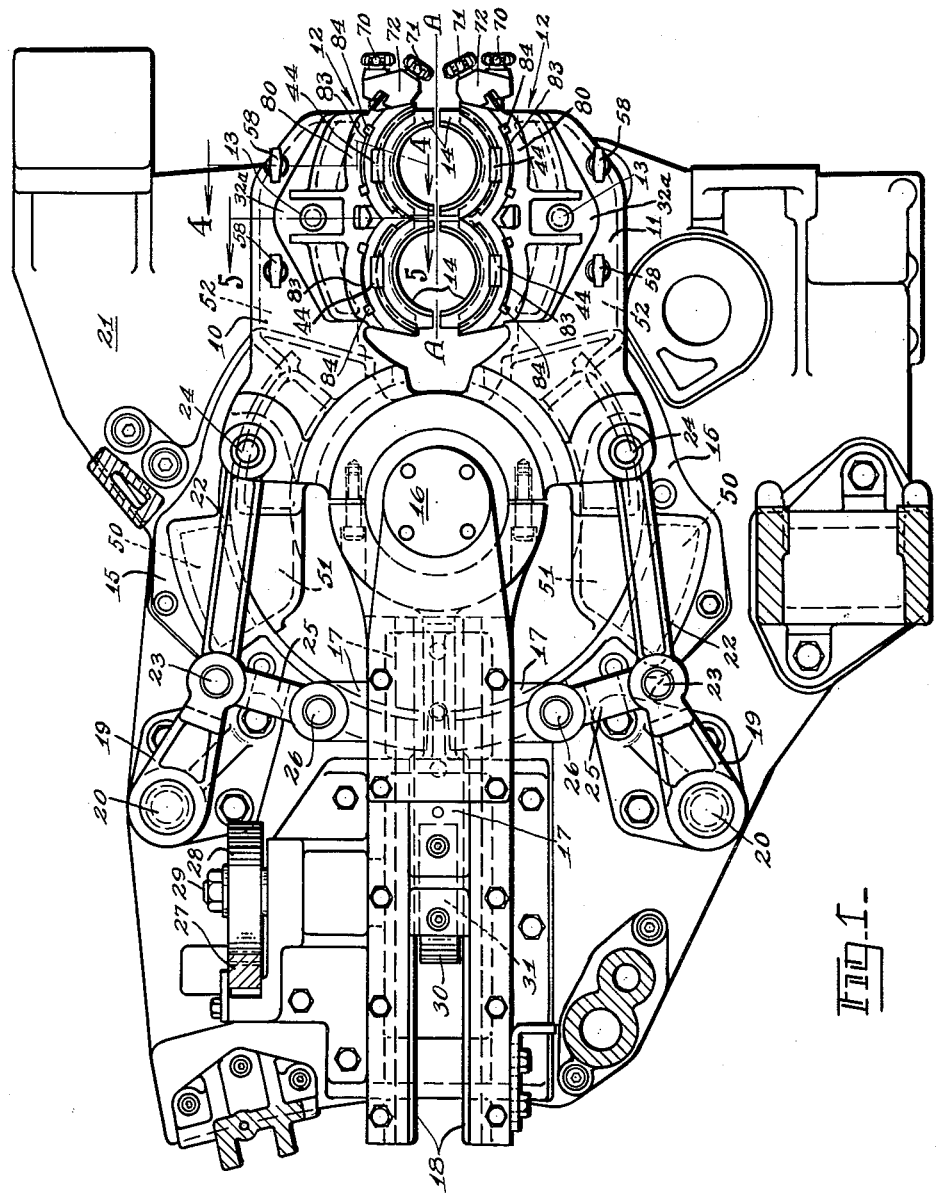
FIG. 1 is a plan view of a blank mold assembly of a glass forming machine, including mold arms and their operating mechanism.

On the accompanying drawings, blank mold arms 10 and 11 carry mold adapters 12 secured by pins 13 (FIGS. 1, 3, and 5). The mold adapters shown are provided to mount, in detachable fashion, a pair of molds made up of complementary mold halves or sections 14. These mountings will be described more in detail hereinafter. The mold arms are mounted on a mold carrier frame 15 for swinging movement about a pivot 16 to and from a mold closed position. Mold arms 10 and 11 are each actuated through a linkage, to be presently described, shown with the molds swung to close along line A—A in FIG. 1. A cross-slide 17 is mounted to slide in guides 18 and is movable to and from pivot 16. Each side of cross-slide 17 has an operating connection with a mold arm through a linkage including a rock arm 19 mounted to swing about a pivot 20 on a base or lower casting 21 attached as a part of the forming machine. Rock arm 19 is connected to a link 22 by a pivot 23, the link 22 being connected by a pivot 24 to the mold arm. A link 25 connects pivot 23 to its respective side of the cross-slide 17 at pivot 26. When the bar is moved forward it operates to swing the mold carrying arms to mold closing position.

Power for operating the mold arms is supplied by a vertically reciprocable cylinder motor (not shown) connected to drive a rack gear 27 in mesh with a pinion 28 keyed to a shaft 29 journaled in the base casting 21. The shaft 29 has keyed to it a second pinion 30 which meshes with a horizontal rack gear 31. Rack gear 31 is bolted to the underside of slidable cross-slide 17 and drives it in reciprocating fashion to open and close the mold.

Figure 2:
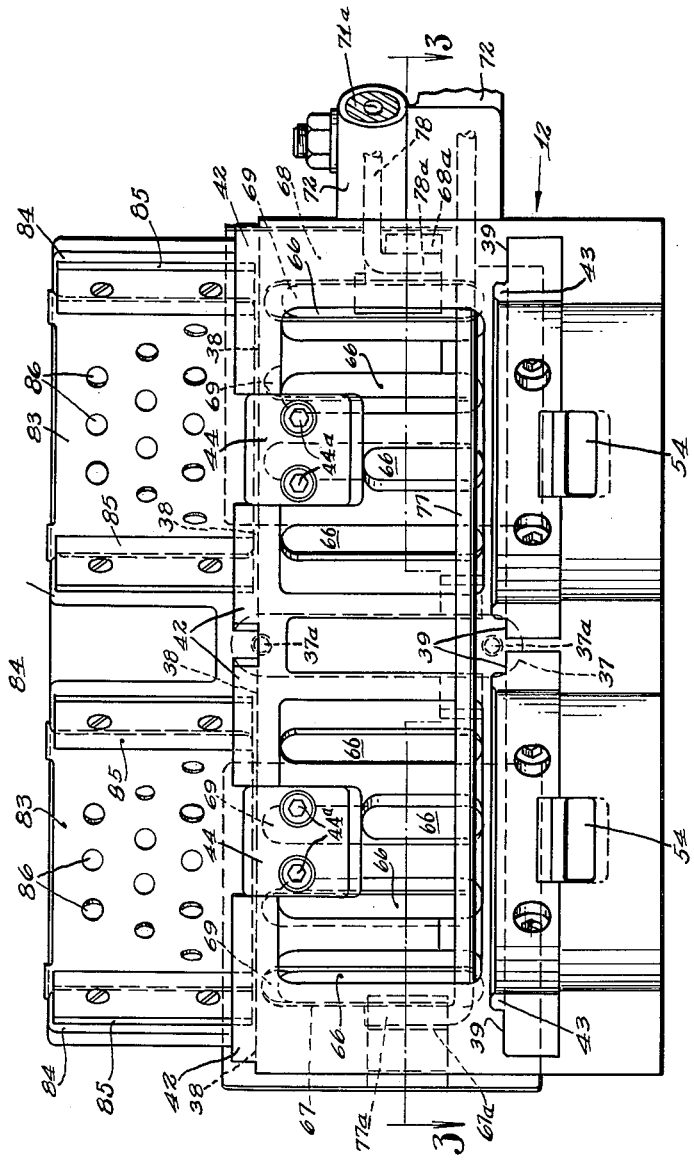
FIG. 2 is an elevation view of a double cavity adapter for detachably mounting side-by-side mold sections, as viewed from the side where the mold sections are to be mounted.

With reference to FIGS. 2-4, the novel mold adapters 12 of the invention will now be described. The adapter has top and bottom horizontal brackets 32a and 32b (FIG. 5) which fit as a yoke about the mold arm 10 and are provided with registering holes that line up with a vertical bore 33 in the mold arm to receive pin 13. A pressure plate 34 is bolted to mold arm 10 opposite pin 13 by studs 35. The plate 34 has an outer face aligned to lie along the outer concave surface 36 of the mold arm (FIG. 3). The adjacent convex surface of the adapter 12 has a corresponding pressure plate 37 bolted thereto by studs 37a. Pressure plate 37 matches its surface with plate 34 in abutting fashion so that when the adapter 12 is assembled with the mold arm, the pressure plates 34 and 37 form the initial point of horizontal engagement between the two parts. This provides a horizontal clearance space between outer concave surface 36 of the mold arm and the near surface of the adapter (FIGS. 3 and 4). The effect of this clearance and the surface contact between pressure plates 34 and 37 provides a floating mounting for the adapter on its mold arm. If, in closing the molds, the horizontal forces are uneven by one pair of the mold halves contacting prior to the other pair, the adapters may pivot slightly or float to equalize their closing and correctly align the blank halves on closing.

The adapter 12, when assembled, has upper and lower outwardly projecting horizontal arcuate surfaces 38 and 39, respectively, that are vertically disposed and parallel. These acts as supporting surfaces for receiving matching supporting lugs 40 and 41, respectively, on each blank mold 14 (FIG. 4), the lower surfaces of these lugs engaging the supporting surfaces 38 and 39. Each of the upper arcuate surfaces 38 of the adapter have a vertical retaining ledge 42, surface 38 and ledge 42 together defining a groove to receive lug 40 of the mold 14 with some clearance space. Likewise, each of the lower arcuate surfaces 39 of the adapter have a vertical retaining ledge 43, surface 39 and ledge 49 together defining a groove to receive lug 41 of the mold 14 with similar clearance space. Each mold 14 is therefore assembled in the adapter by hanging it by its lugs 40 and 41 in these grooves.

Bisecting the center line that is through a diameter of each mold, as it is supported on the adapter, is a pressure plate 44 bolted to the adapter by studs 44a (FIGS. 1 and 2). This pressure plate projects horizontally sufficiently so that it makes initial horizontal engagement with the exterior surface of the mold. The effect of the clearance space between the lugs and their grooves and the surface contact between the pressure plates effectively provide a floating mounting for the molds on their adapters. This floating mounting for the blank molds in the adapters facilitates self-alignment or registration of the mold on the underlying neck rings (not shown) when the blank molds are closed about the neck molds. As shown in FIG. 4, an annular enlargement 45 at the top forming portion of blank cavity will close about a matching portion of the neck ring. Hence, just before a charge or gob of glass is dropped into the blank mold through its opposite open end, the blank molds are closed about the neck ring and the loose fit between the grooves 38—42 and 39—43 and lugs 40 and 41 permits the blank molds to float in their adapter mounting so that the cavity of the closed molds will be in register with the cavity of the underlying neck mold. After a charge of glass is deposited in the closed blank mold, the open end is closed by a baffle seating on annular shoulder 46, whereupon counterblow air is blown into the charge through the neck mold to distribute the glass and form and set up the blank or parison shape of glass in the blank mold cavity. The pressure plate 44 provides a pivot point for each mold half in making this registering adjustment. If, when the blank molds close about the neck rings, they float or adjust so their seam or parting line are out-of-line with the center line through the mold arm pivot 16 (FIG. 1), the molds would not close tightly and uniformly, but the floating mounting for the adapters allows the adapter to rock or float sufficiently and perfect a uniform and tight closing fit between the mold halves.

The foregoing description has been directed to the features of the invention providing for a quick detachable mounting for the blank molds permitting easy change of molds while the forming machine is operating, and also providing for self-alignment of the blank mold halves in the assembly when the mold halves are closed about the neck rings.

Referring now to FIGS. 1–4, another novel feature of the invention will be described which provides three-way controlled cooling for the molds through the above described adapters for mounting the molds.

Cooling air is supplied from a source connected at the underside of the base casting 21 to passageways 50 therein (FIG. 1). Each passageway 50 extends upwardly in the casting to communicate with a chamber 51 formed in each side of the mold carrier frame 15 which in turn communicates with a passage 52 through the adjoining mold arm, and terminates in a wind box 53 at the outer end of each of the mold arms (FIGS. 3 and 4). From wind box 53, the cooling air is distributed through the adapter 12 and applied around the mold halves 14 to cool in a controlled manner selected vertical areas of the mold. These areas, as will become apparent from the following description, correspond to (1) neck portion of each blank mold, (2) body or central portion of each blank mold, and (3) bottom portion of each blank mold.

Neck cooling

When the adapter 12 is assembled and held by pin 13 on the mold arm, a pair of lower ducts 54 therein communicate with a pair of nozzles 55 on the mold arm and below wind box 53. The nozzles and ducts are opposite the mounting place for the mold halves on the adapter. Two throats 56 are provided in the lower section of wind box 53 and each communicates with lower section of wind box 53 and connect it with the entrance 55a of their respective nozzles 55. A butterfly valve 57 is pivotally mounted on its circular end bearings 57a and 57b in each entrance 55a and the vane 57c of valve 57 is flat to be positionable, when rotated, to regulate the air flow through its nozzle 55. Each valve 57 is regulated individually by turning a corresponding knob 58 keyed on a vertical shaft 59 that is journaled in the mold arm. The lower end of shafts 59 each have a bevel gear 60 keyed thereon and assembled so that knobs 58 are frictionally held in their set position by bearing against the upper face of washer 61. Each gear 60 is in mesh with a matching bevel gear 62 keyed to a shaft 63 to that valve unit. Shafts 63 are integrally attached to project axially from end bearing 57b of each butterfly valve 57. Hand rotation of the knobs 58 in either direction by the forming machine operator will make a corresponding adjustment of the amount of the opening in throats 56 and regulate the cooling air supplied from the wind box 53 to the nozzle 55 and accordingly regulate the cooling of the neck portion of the blank mold. To further enhance cooling of this portion of the mold, an annular channel 64 is provided in each mold half and a radial bore 65 in each mold half communicates with channel 64 and is aligned to receive directly the stream of cooling air from the aligned duct 54. The molds may be relieved outwardly from channel 64 at the mold seam (not shown) to permit escape of the air. The air being supplied by each nozzle 55 is thus applied to cool the neck portion of the glass parison being formed in the blank mold cavity and is controllable individually for each side of the mold. These controls may be adjusted while the machine is operating.

Body cooling

Cooling air in wind box 53 is also supplied against the central body portion of mold 14 (FIGS. 3 and 4). A series of openings 66 are formed in adapter 12 that connect to the wind box 53 and open against the blank mold surface over an area between surfaces 38 and 39 for supporting or hanging the mold at its lugs 40 and 41. The air flow through openings 66 is controlled opposite each blank mold and individual therefor by two sliding curtains 67 and 68, curtain 67 being fitted for sliding movement to cover the openings opposite the inside blank mold (left-hand mold in FIGS. 1, 2 and 3) and curtain 68 being fitted for similar sliding movement opposite the outside blank mold (right-hand mold in FIGS. 1, 2 and 3). Each curtain has openings 69 which, by sliding the curtains, may be matched up to coincide with the openings 66 (FIG. 2), and thereby permit maximum cooling air to flow from wind box 53 and against the body portion of the blank mold (FIG. 4).

Each of the curtains 67 and 68 are shiftable individually to slide across openings 66 and regulate the size of openings 66 or close them completely, the latter condition providing minimum cooling for the body of the blank mold. The curtains are operated by individual hand adjusting knobs (FIG. 3), curtain 67 being controlled by adjusting knob 70 and curtain 68 by adjusting knob 71. These knobs are each rotatably mounted in a casting 72 integrally attached to the side of the adapter 12. The hubs 70a and 71a of the knobs are each journaled in casting 72 at bores therein and each similarly held in place for rotation but held against axial movement by a spring loaded pin 74 fitting in an annular groove 75. A threaded axial bore 76 is provided in each of hubs 70a and 71a. A rod 77 has an upturned end portion 77a journaled in block 67a integral on the end of curtain 67 (FIG. 2). Rod 77 thence extends across the adapter and has a threaded end 77b that is engaged with the threads in the axial bore of hub 70a (FIG. 3). Thus, rotation of knob 70 will adjust the position of curtain 67 opposite the inside blank mold on the adapter. A rod 78 having a downturned end portion 78a is journaled in block 68a integral on the end of curtain 68 (FIG. 2). Rod 78 has a threaded end portion 78b (FIG. 3) engaged with the internal threads in the bore of hub 71a. Rotation of the knob 71 will adjust the position of curtain 68 opposite the outside blank mold. The air admitted through openings 66 at either curtain 67 or 68 circulates and escapes above and below blocks 67a and 68a, respectively.

Thus, the body cooling of either mold is controllable by the machine operator. These adjustments may be made while the machine is operating.

*Bottom cooling*

The adapter 12, when assembled on a mold arm, has a pair of arcuate upper housings 80 defining upper ducts 81 therein that are connected to wind box 53 through corresponding ports 82 in the top of the mold arm. Each duct 81 takes the form of an elbow which bends 90° to terminate in a vertical opening around one of the blank molds at its portion wherein the bottom portion of the parison is formed (FIG. 4). Cooling air is continuously supplied through ducts 81 and directed onto this portion of the blank mold and is controlled or regulated by inserting a removable damper 83 across the vertically disposed end opening of the duct. Each damper is arcuate and held at its side margins in slots formed between posts 84 and plates 85 thereon. The dampers 83 have a series of perforations 86 preferably arranged in staggered rows to regulate the amount and location of air flow directed onto this area of the blank mold. The air emitted through dampers 83 circulates around the outer mold surface and escapes upwardly. The dampers 83 are removable and replaceable by dampers having either greater or lesser perforated area. The maximum cooling is obtainable, obviously, by removal of the dampers entirely from their mountings on posts 84. On the other hand, minimum cooling is obtainable by inserting a damper without perforations so as to effectively close off ducts 81. On a rotary machine, it is generally necessary to stop the machine to change or regulate this cooling by changing or removing the dampers, however, on a stationary machine, such as the well-known Hartford-Empire "IS" type machine, the dampers might be changed while the machine is operating.

By way of summary, it has been pointed out in connection with this invention that there is provided an arrangement of mold adapters mounted for carying molds through opening and closing movement, for self-aligning and equalizing the molds on closing them, and for conducting and regulating cooling air to the blank molds such that they each receive individual three-way cooling individually controlled, the three-way cooling being applied at the neck portion, the central or body portion and the bottom portion of the mold.

Two of the three controls for this cooling are readily adjustable while the machine is operating, or to put it another way, the cooling may be regulated or changed at two of the portions of the mold without interrupting operation of the forming machine. The third control may require interruption of operation on rotary machines. In the preferred embodiment of the invention, herein illustrated, the latter-mentioned control is utilized to control the cooling of the bottom portion of a blank mold because this portion has the more stable condition of heat transmission of the three portions mentioned. When the gob is dropped into the mold, it settles first into the neck portion and central portion of the mold where the initial heat is removed. After the baffle closes the bottom end opening of the mold cavity and counter blow air is applied through the neck to distribute and form the parison, the glass is then distributed so as to contact the bottom portion of the mold. At this stage of the cycle, the heat in the glass is generally quite stable, as between successive cycles, and that part of the mold will need the least adjustment of the cooling air for that mold shape. The other two portions of the mold may vary in temperature depending upon variations in temperature of the glass as it is fed or charged to the mold. By the arrangement herein described and illustrated, the cooling at the neck and central or body portions of the mold may be readily adjusted while the machine is in operation to suit the operator's requirements.

In the foregoing detailed description of FIGS. 2–5, the mold adapter described is indicated as connected to mold arm 10, however, the complementary adapter for mold arm 11 is similarly constructed.

It should be understood from the foregoing description that, by appropriate modifications, the invention may be adapted for use with a finishing mold or final blow mold assembly as well as with a blank mold assembly.

It will, of course, also be understood that various details of construction may be modified through a wide range without departing from the principles of this invention, and it is, therefore, not the purpose to limit the patent granted hereon otherwise than necessitated by the scope of the appended claims.

I claim:

1. A glass forming mold assembly comprising plural, separate side-by-side molds, each comprised of complementary half-sections, a mold carrier frame, mold arms pivotally mounted on the carrier frame for movement toward and away from each other, a mold adapter pivotally attached on each said arm, a pressure member secured to each arm adjacent the pivotal attachment of said arm and said adapter, a corresponding pressure plate attached to each adapter and engaging the pressure member on the arm, whereby the adapter is permitted limited horizontal floating movement on the arm, means for slidably mounting said mold half-sections in side-by-side relationship respectively on the mold adapters, said means permitting horizontal floating movement of said mold half-sections with respect to their adapter, and a plurality of pressure elements secured to and projecting horizontally from each of said adapters, each of said half-sections being engageable with one of said elements on a diametral line normal to the meeting faces of said sections, the last-mentioned pressure elements each providing a pivot point permitting horizontal rocking movement of its mold half.

2. A glass forming mold assembly comprising plural, separate side-by-side molds, each comprised of complementary mold half-sections positionable in juxtaposed relationship in a closed position wherein they register on a matching closed neck mold, a mold carrier frame, mold arms pivotally mounted on the carrier frame for movement toward and away from each other, a mold adapter pivotally attached on each said arm, a pressure member secured to each arm adjacent the pivotal attachment of said arm and said adapter, a corresponding pressure plate attached to each adapter and engaging the pressure member on the arm, whereby the adapter is permitted limited horizontal floating movement on the arm, means for detachably mounting said pairs of individual mold half-sections in side-by-side relationship respectively on the mold adapters, said means comprising plural, vertically spaced apart mold supporting grooves having parallel support surfaces, corresponding plural lug members on each mold half-section having parallel surfaces engaging the support surfaces of said grooves which permit horizontal floating movement of said mold half-sections with respect to the adapter therefor, and a plurality of pressure elements secured to and projecting horizontally from each of said adapters, each of said half-sections being engageable with one of said elements on a diametral line normal to the meeting faces of said sections, the last-mentioned pressure elements each providing a pivot point permitting horizontal rocking movement of its mold half.

References Cited in the file of this patent

UNITED STATES PATENTS

| | | |
|---|---|---|
| 1,827,698 | Benoit | Oct. 13, 1931 |
| 1,845,654 | Flexon | Feb. 16, 1932 |
| 2,018,785 | Harrison | Oct. 29, 1935 |
| 2,031,739 | Shaffer | Feb. 25, 1936 |
| 2,402,475 | Waterbury et al. | June 18, 1946 |
| 2,702,444 | Rowe | Feb. 22, 1955 |
| 2,744,358 | Rowe | May 8, 1956 |
| 2,751,715 | Denman | June 26, 1956 |
| 2,757,485 | Fedevich | Aug. 7, 1956 |

FOREIGN PATENTS

| | | |
|---|---|---|
| 382,204 | Great Britain | Oct. 20, 1932 |
| 426,311 | Great Britain | Apr. 1, 1935 |